United States Patent
Katayama et al.

(10) Patent No.: US 11,732,332 B2
(45) Date of Patent: Aug. 22, 2023

(54) NICKEL-BASE ALLOY WELDING MATERIAL, WELDING MATERIAL FOR NUCLEAR REACTOR, NUCLEAR POWER APPARATUS AND NUCLEAR POWER STRUCTURE, AND METHOD OF REPAIRING NUCLEAR POWER APPARATUS AND NUCLEAR POWER STRUCTURE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yoshinori Katayama, Yokohama Kanagawa (JP); Wataru Kono, Yokohama Kanagawa (JP); Minoru Obata, Yokohama Kanagawa (JP); Yasuo Morishima, Yokohama Kanagawa (JP); Takahiro Hayashi, Yokohama Kanagawa (JP); Yumiko Abe, Yokohama Kanagawa (JP); Daiki Tanaka, Yokohama Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/866,578

(22) Filed: May 5, 2020

(65) Prior Publication Data

US 2020/0377974 A1 Dec. 3, 2020

(30) Foreign Application Priority Data

May 28, 2019 (JP) ................................ 2019-099421
Nov. 28, 2019 (JP) ................................ 2019-215731

(51) Int. Cl.
*C22C 19/05* (2006.01)
*B23K 35/30* (2006.01)
*B23K 9/00* (2006.01)

(52) U.S. Cl.
CPC .............. *C22C 19/053* (2013.01); *B23K 9/00* (2013.01); *B23K 35/304* (2013.01)

(58) Field of Classification Search
None
See application file for complete search history.

(56) References Cited

U.S. PATENT DOCUMENTS

| 7,755,001 B2 | 7/2010 | Nakajima et al. |
| 2003/0005981 A1* | 1/2003 | Ogawa .................. C22C 19/056 148/428 |

(Continued)

FOREIGN PATENT DOCUMENTS

| CN | 106756247 B | 10/2018 |
| EP | 1 369 497 A1 | 12/2003 |

(Continued)

OTHER PUBLICATIONS

Katayama et al., "Effect of processing on SCC susceptibility of nickel-base weld metal in high temperature water," Proceedings of JSCE Materials arid Environments (2005), pp. 1-2.

*Primary Examiner* — Xiaobei Wang
(74) *Attorney, Agent, or Firm* — Finnegan, Henderson, Farabow, Garrett & Dunner, LLP (57) ABSTRACT

A nickel-base alloy welding material according to an embodiment comprises: Cr (chromium) larger than 30.0% and less than or equal to 36.0% by mass; C (carbon) less than or equal to 0.050% by mass; Fe (iron) larger than or equal to 1.00% and less than or equal to 3.00% by mass; Si (silicon) less than or equal to 0.50% by mass; Nb (niobium)+ Ta (tantalum) less than or equal to 3.00% by mass; Ti (titanium) less than or equal to 0.70% by mass; Mn (man- (Continued)

| Alloy | | Cr | C | Fe | Si | Nb+Ta | Ti |
|---|---|---|---|---|---|---|---|
| Nickel-base alloy welding material | A | 30.1 | less than 0.05 | 2.00 | 0.11 | 2.70 | 0.45 |
| Nickel-base alloy welding material | B | 32.9 | less than 0.06 | 1.97 | 0.10 | 2.72 | 0.47 |
| Nickel-base alloy welding material | C | 36.0 | less than 0.07 | 2.01 | 0.10 | 2.70 | 0.45 |
| Nickel-base alloy welding material | D | 30.1 | less than 0.08 | 1.99 | 0.12 | 2.74 | 0.48 |

| | Mn | Cu | Mo | P | S | Ni |
|---|---|---|---|---|---|---|
| A | 2.85 | 0.02 | - | less than 0.001 | less than 0.001 | Remainder |
| B | 2.86 | 0.02 | - | less than 0.002 | less than 0.002 | Remainder |
| C | 2.82 | 0.02 | - | less than 0.003 | less than 0.003 | Remainder |
| D | 2.93 | 0.02 | 2.90 | less than 0.004 | less than 0.004 | Remainder |

(mass %)

ganese) larger than or equal to 0.10% and less than or equal to 3.50% by mass; Cu (copper) less than or equal to 0.5% by mass, and a remainder is Ni and unavoidable impurities.

8 Claims, 9 Drawing Sheets

(56) References Cited

U.S. PATENT DOCUMENTS

| | | | | |
|---|---|---|---|---|
| 2007/0272671 | A1* | 11/2007 | Nakajima | C22C 19/058 |
| | | | | 219/146.22 |
| 2011/0240715 | A1 | 10/2011 | Rebak et al. | |
| 2014/0305921 | A1* | 10/2014 | Kawasaki | B23K 35/3033 |
| | | | | 219/146.22 |
| 2019/0039188 | A1* | 2/2019 | Ikeda | B23K 35/0227 |
| 2022/0205066 | A1* | 6/2022 | Schmidt | B22F 9/082 |

FOREIGN PATENT DOCUMENTS

| | | | |
|---|---|---|---|
| EP | 2 671 669 A1 | | 12/2013 |
| JP | H06-89426 | * | 11/1994 |
| JP | 07316698 A | * | 12/1995 |
| JP | H11-12669 A | | 1/1999 |
| JP | 2005-288500 | * | 10/2005 |
| JP | 2013-527805 | | 7/2013 |
| JP | 2017-205800 A | | 11/2017 |
| KR | 10-2020-0063383 A | | 6/2020 |
| WO | WO 2016/081940 A1 | | 5/2016 |

\* cited by examiner

FIG. 1

| Alloy | | Cr | C | Fe | Si | Nb+Ta | Ti |
|---|---|---|---|---|---|---|---|
| Nickel-base alloy welding material | A | 30.1 | less than 0.05 | 2.00 | 0.11 | 2.70 | 0.45 |
| Nickel-base alloy welding material | B | 32.9 | less than 0.06 | 1.97 | 0.10 | 2.72 | 0.47 |
| Nickel-base alloy welding material | C | 36.0 | less than 0.07 | 2.01 | 0.10 | 2.70 | 0.45 |
| Nickel-base alloy welding material | D | 30.1 | less than 0.08 | 1.99 | 0.12 | 2.74 | 0.48 |

| | Mn | Cu | Mo | P | S | Ni |
|---|---|---|---|---|---|---|
| A | 2.85 | 0.02 | – | less than 0.001 | less than 0.001 | Remainder |
| B | 2.86 | 0.02 | – | less than 0.002 | less than 0.002 | Remainder |
| C | 2.82 | 0.02 | – | less than 0.003 | less than 0.003 | Remainder |
| D | 2.93 | 0.02 | 2.90 | less than 0.004 | less than 0.004 | Remainder |

(mass %)

| Test piece | Cracked test pieces / No of test pieces |
|---|---|
| Test piece made of nickel-base alloy welding material A | 0 / 4 |
| Test piece made of nickel-base alloy welding material B | 0 / 4 |
| Test piece made of nickel-base alloy welding material C | 0 / 4 |

NICKEL-BASE ALLOY WELDING MATERIAL, WELDING MATERIAL FOR NUCLEAR REACTOR, NUCLEAR POWER APPARATUS AND NUCLEAR POWER STRUCTURE, AND METHOD OF REPAIRING NUCLEAR POWER APPARATUS AND NUCLEAR POWER STRUCTURE

CROSS-REFERENCE TO RELATED APPLICATION

This application is based upon and claims the benefit of priority from Japanese Patent Application No. 2019-99421 filed on May 28, 2019, and Japanese Patent Application No. 2019-215731 filed on Nov. 28, 2019, the entire content of which is incorporated herein by reference.

FIELD

The present invention relates to a nickel-base alloy welding material, a welding material for nuclear reactor, a nuclear power apparatus and a nuclear power structure, and a method of repairing a nuclear power apparatus and a nuclear power structure.

BACKGROUND

It is reported that events such as stress corrosion cracking (SCC) have occurred at the welded parts of the reactor structures in the boiling-water reactor (BWR) plants. More specifically, SCC took place in the case where series-182 alloy containing SCC-sensitive Cr in 14 to 17% by mass was used as welding material. Further, it is reported that SCC also occurred when series-82 alloy was used as welding material. Series-82 alloy caused damages, though it contains Cr at 18 to 22% by mass and is better than series-182 alloy in terms of anti-SCC property.

In the pressurized-water reactor (PWR) plant, where temperature environment is severe than in the BWR plants, the parts of the reactor are welded by using alloy 52 that is series-690 alloy. Alloy 52 contains Cr at 28% to 31.5% by mass, and has a higher Cr content than series-82 alloy.

If used in an alloy, Cr generally enhances the anti-SCC property of the alloy. The higher the content of Cr in the alloy, the more can Cr lower the SCC-sensitivity of the alloy.

SUMMARY OF THE INVENTION

Problems to be Solved by the Invention

In the BWR plant, series-82 alloy that has high anti-SCC property is used as welding material. However, series-82 alloy may fail to prevent SCC, possibly making damages. In this case, any other welding material having higher anti-SCC property than series-82 alloy must be used alternatively.

In the PWR plant, series-52 alloy that excels series-82 alloy in anti-SCC property is used. This is because series-52 alloy has high Cr content. At for welding, however, the series-52 alloy may crack more likely than series-182 alloy and series-82 alloy, at high temperatures or at ductility decrease during the welding. This is because the Cr content of the series-52 alloy is as high as, for example, nearly 30%. Further, the 52 alloy has not ever used as welding material in the BWR plant. In order to use the series-52 alloy in the BWR plant, appropriate welding conditions must be established for this alloy. Background described above are disclosed in Japanese Patent Application Laid-Open Publication No. 2013-527805, and Japanese Patent Application Laid-Open Publication No. Hei 11-012669.

DETAILED DESCRIPTION

In view of the above, an object of the present embodiment is to provide a nickel-base alloy welding material that excels in welding property.

According to an aspect of the present invention, there is provided a nickel-base alloy welding material comprising: Cr (chromium) larger than 30.0% and less than or equal to 36.0% by mass; C (carbon) less than or equal to 0.050% by mass; Fe (iron) larger than or equal to 1.00% and less than or equal to 3.00% by mass; Si (silicon) less than or equal to 0.50% by mass; Nb (niobium)+Ta (tantalum) less than or equal to 3.00% by mass; Ti (titanium) less than or equal to 0.70% by mass; Mn (manganese) larger than or equal to 0.10% and less than or equal to 3.50% by mass; Cu (copper) less than or equal to 0.5% by mass, and a remainder is Ni and unavoidable impurities.

According to another aspect of the present invention, there is provided a welding material for use in nuclear reactors, said welding material using the nickel-base alloy welding material described above.

According to another aspect of the present invention, there is provided a nuclear power apparatus and a nuclear power structure, each using the nickel-base alloy welding material described above.

According to another aspect of the present invention, there is provided a method of repairing a nuclear power apparatus and a nuclear power structure, the method comprising: a step of preparing nickel-base alloy welding material described above, as welding material for mending the nuclear power apparatus and the nuclear power structure; and a step of using the nickel-base alloy welding material, thereby mending the nuclear power apparatus and the nuclear power structure.

Hereinafter, with reference to the drawings, a nickel-base alloy welding material, a welding material for nuclear reactor, a nuclear power apparatus and a nuclear power structure, and a method of repairing a nuclear power apparatus and a nuclear power structure will be described. Throughout the description, the same reference numerals are given to the same or similar parts, and overlapped description will be omitted.

The nickel-base alloy welding material according to the first embodiment of this invention is composed of a nickel base alloy that has the chemical composition specified below. In the following description, the percentage (%) showing the chemical composition stands for mass percentage unless otherwise specified.

The nickel-base alloy welding material is composed of the following: Cr (chromium) is larger than 30.0% and less than or equal to 36.0%; C (carbon) is less than or equal to 0.050%; Fe (iron) is larger than or equal to 1.00% and less than or equal to 3.00%; Si (silicon) is less than or equal to 0.50%; Nb (niobium)+Ta (tantalum) is less than or equal to 3.00%; Ti (titanium) is less than or equal to 0.70%; Mn (manganese) is larger than or equal to 0.10% and less than or equal to 3.50%; Cu (copper) is less than or equal to 0.5%; and the remainder is Ni (nickel) and unavoidable impurities.

The nickel-base alloy welding material according to the second embodiment further contains Mo (molybdenum); and Mo is larger than or equal to 2.00% and less than or equal to 5.00%.

The nickel-base alloy welding material according to another embodiment is a material according to the first or second embodiment, which further comprises any one of Zr (zirconium) less than or equal to 0.05%, B (boron) less than or equal to 0.05%, V (vanadium) less than or equal to 0.5%, Al (aluminum) less than or equal to 0.5% and Co (cobalt) less than and equal to 0.12%.

As the unavoidable impurities in the nickel-base alloy welding materials specified above, P (phosphorus) and S (sulfur) are exemplified. These impurities are components contained in raw materials such as the ores and scrap used to produce the nickel-base alloy welding material or are components mixed during manufacturing of the welding material.

The nickel-base alloy welding material having the chemical composition specified above can be used as welding material for use in nuclear reactors, for the purpose of the welding throughout the constituting members of the internal structures provided in the pressure vessels of the BWR or PWR plant. The welding material for use in the BWR or PWR plant is available in the form of rods, wires or powder using the nickel-base alloy welding material so that welding may be well performed in practice.

All components constituting the internal structure of the nuclear reactor may be welded by using the nickel-base alloy material according to this embodiment. Alternatively, some of the members constituting the internal structure of the nuclear reactor may be welded by using the nickel-base alloy material according to this embodiment.

It will be explained below why the components of the nickel-base alloy welding material according to the embodiments described above are used in the chemical-composition ranges specified above.

(1) Cr

Cr is an indispensable element for enhancing anti-SCC property, oxidation resistance, corrosion resistance and mechanical strength of the nickel-base alloy welding material. Further, Cr is a constituent element of $M_{23}C_6$-type carbide that forms a reinforcement layer. Generally, the higher the Cr content is, the more the corrosion resistance will increase. If the Cr content is too high, however, the nickel-base alloy welding material will be expensive, and the α-phase, i.e. harmful phase, will precipitate, reducing the mechanical strength of the nickel-base alloy welding material and lowering the welding property thereof.

The Cr content is preferably about 26% or more. In this embodiment, the Cr content ranges over 30%. In the example described later, the Cr content was increased up to 36.0%, confirming that good results were obtained.

Therefore, in the present invention, the Cr content is set, exceeding 30.0% and being less than, or equal to, 36.0%.

(2) C

C is useful as deoxidizer in the course of dissolving, and as material for increasing the mechanical strength of the nickel-base alloy welding material. C is also a constituent element of $M_{23}C_6$-type carbide that forms an enhancement layer, and effectively guarantees the fluidity of the molten metal in the casting process. If the content of C exceeds 0.05%, Cr carbide will precipitate, depleting Cr near the grain interface, reducing the anti-SCC property of the alloy. Further, the alloy may have its ductility reduced and may therefore crack. This is why the content of C is set to 0.05% or less. If the content of C is less than 0.001%, the mechanical strength of the nickel-base alloy welding material cannot be increased. The content of C should therefore be 0.001% or more. Nonetheless, C may not be added on purpose, if other element or elements are added, and the mechanical strength of the nickel-base alloy welding material is thereby enhanced sufficiently.

(3) Fe

Fe is useful in enhancing the mechanical strength of the nickel-base alloy welding material. If the Fe content is less than 1.00%, the mechanical strength will decrease. On the other hand, if the Fe content exceeds 3.00%, the corrosion resistance of the nickel-base alloy welding material will decrease. Therefore, the Fe content is set to a value ranging from that equal to or more than 1.00% to that equal to or less than 3.00%.

(4) Si

Si is useful as deoxidizer for molten metal and has an effect of enhancing the fluidity of the molten metal in casting process. As the Si content increases, nonmetallic debris is formed, reducing the corrosion resistance of the nickel-base alloy welding material. The Si content should therefore be as low as possible. If the Si content exceeds 0.50%, the casting property or mechanical strength of the nickel-base alloy welding material will decrease. In view of this, the Si content is set to 0.50% or less. If the Si content is less than 0.001%, Si cannot be expected to function as deoxidizer for the molten metal. Therefore, the Si content should preferably be 0.001% or more. However, if any other element is added, achieving sufficient deoxidizing in the molten metal, any intentional addition of any other element need not be performed.

(5) Nb+Ta

Nb and Ta may form carbides, suppressing production of Cr carbides and ultimately enhancing the anti-SCC property of the nickel-base alloy welding material. If Nb content and Ta content are too high, however, welding crack may likely to occur. This is why the content of Nb and Ta is set to 3.00% or less.

If the content of Nb+Ta is less than 0.01%, the production of Cr carbides cannot be suppressed. It is therefore desirable that the content of Nb+Ta should be 0.01 or more. However, if any other element is added, sufficiently suppressing the production of Cr carbides, any intentional addition of Nb+Ta need not be performed.

Herein, "Nb+Ta" means the total amount of Nb and Ta used. As long as the total amount enters within the range specified above, either Nb or Ta need not be used, or both Nb and Ta may be used.

(6) Ti

Ti forms a carbide, suppressing the production of Cr carbides and enhancing the anti-SCC property of the nickel-base alloy welding material. If its content exceeds 0.70%, welding crack will possibly occur. This is why its content is set at 0.70% or less. The content should preferably be 0.001% or more, in order to suppress the production of Cr carbides. However, if any other element is added, sufficiently suppressing the production of Cr carbides, intentional addition of Ti may not be necessary.

(7) Mn

Mn is an element that stabilizes austenite, and combines with S (sulfur) that may make the nickel-base alloy welding material brittle. MnS produced by combination of Mn with S prevents the material from becoming brittle and hence increases the strength and melt flow of the material. If the Mn content is less than 0.10%, the material may become brittle and may not have its strength increased. If the Mn content exceeds 3.50%, Mn may combine with S, for example, possibly forming non-metallic impurities and ultimately reducing the corrosion resistance of the nickel-base alloy welding material. Moreover, as austenite is stabilized, the nickel-base alloy welding material becomes more likely to undergo welding crack. This is why the Mn content is set within the range of 0.10% to 3.50%.

(8) Cu

Cu helps to enhance the strength of the nickel-base alloy welding material. If Cu is added too much, however, welding crack may occur. The Cu content should therefore be 0.5% or less. In order to increase the inter-granular strength of the nickel-base alloy welding material, the Cu content should better be at least 0.001%. If the nickel-base alloy welding material is made sufficiently strong by adding any other element, Cu need not be added at all intentionally.

(9) Mo

Mo increases the strength of the nickel-base alloy welding material and effectively reduces the cracking which results from the decrease of ductility. If Mo is added too much, however, an embrittlement layer will be formed. In view of this, the Mo content should range, preferably from that equal to or more than 2.00% to that equal to or less than 5.00%.

(10) Zr

Zr enhances the inter-granular strength and effectively prevents the nickel-base alloy welding material from cracking due to the decrease of its ductility. If Zr is added too much, however, it will lower the welding property of the nickel-base alloy welding material. Hence, the Zr content should preferably be 0.05% or less. To suppress the cracking of the material caused by the ductility decrease, the Zr content should better be 0.001% or more. If the material can be well prevented from cracking due to its ductility decrease, other additive elements can be used and Zr need not be added intentionally.

(11) B

B is effective in enhancing the inter-granular strength of the nickel-base alloy welding material. The B content should better be 0.05% or less. Preferably, the B content is 0.01% or more in order to increase the inter-granular strength of the material. However, B need not be added intentionally if the material can have its inter-granular strength sufficiently increased by using other additive elements.

(12) V

V is effective in increasing the strength of the nickel-base alloy welding material. If V is used too much, however, it will reduce the ductility of the material. In view of this, the V content should better be 0.5% or less. The V content should preferably be 0.01% or more in order to enhance the strength of the material. However, V need not be added intentionally if the material can have its strength sufficiently increased by using other additive elements.

(13) Al

Al is effective in increasing the strength of the nickel-base alloy welding material and in deoxidizing the material. If Al is used too much, however, it will form slug and the like, reducing the welding efficiency. Hence, the Al content should better be 0.5% or less. The Al content should preferably be 0.01% or more in order to increase the strength of the material and to deoxidize the material effectively. However, Al need not be added intentionally if the nickel-base alloy welding material can have its strength sufficiently increased and well deoxidized by using other additive elements.

(14) Co (Cobalt)

Cobalt isotope $^{60}$Co disintegrates, changing to gamma rays. In view of this, the cobalt content should be 0.12% or less if cobalt is used in the nuclear reactor.

(15) P and S

P and S are classified as impurities unavoidably existing in the nickel-base alloy welding material according to this embodiment. The content of these impurities existing in the nickel-base alloy welding material should better be reduced as much as possible, nearly to 0%.

P produces embrittlement of the grain boundary, reducing the corrosion resistance of the nickel-base alloy welding material. Further, P may segregate, resulting in many welding cracks. In view of this, the P content should be reduced to 0.005% or less. If the content of S is greater than 0.010%, S will react with Mn, forming nonmetallic debris and ultimately reducing the corrosion resistance of the nickel-base alloy welding material. In view of this, the S content should better be 0.005% or less. If both the P content and the S content are 0.005%, the coagulation cracking will be suppressed.

The nickel-base alloy welding material and the welding material for use in nuclear reactors, both being the embodiments of this invention, have better anti-SCC property than the alloys (e.g., series-182 alloy and series-82 alloy) used as welding material in the existing BWR plants. In addition, both the nickel-base alloy welding material and the welding material have good weldability. Hence, if the nickel-base alloy welding material is used, the parts in any nuclear power plant will be welded easily and can have an increased anti-SCC property.

EXAMPLES

Examples of this invention will be described in detail, with reference to the drawings and tables attached hereto. The invention is not limited to the examples described below, nevertheless.

(Step 1)

Figure 1:
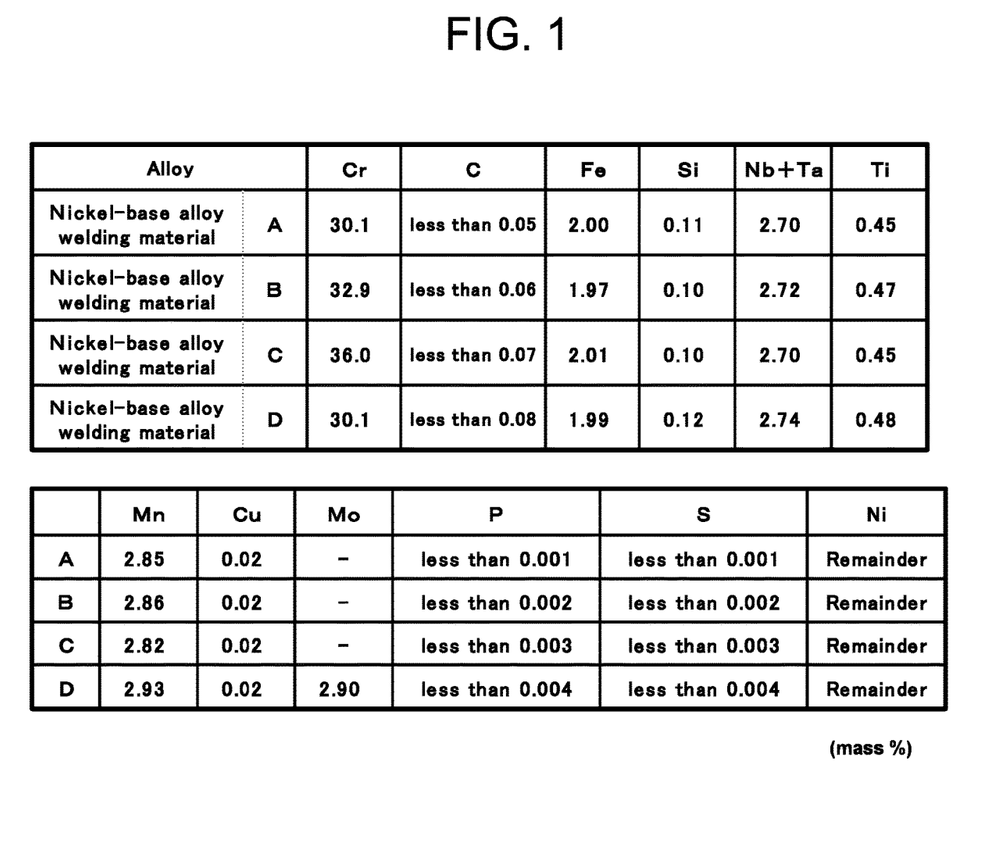
FIG. 1 is a table for comparison, showing the chemical compositions of the nickel-base alloy welding material according to a present invention.

FIG. 1 is a table used for comparison, showing the chemical compositions of four examples A, B, C and D of the nickel-base alloy welding material.

To produce each of the four nickel-base alloy welding materials, each having a specific chemical composition, various necessary raw materials were melted in a vacuum induction furnace, and an ingot measuring about 150 mm×150 mm×450 mm was prepared. The ingot was forged, making a rod having a diameter of 60 mm and a length of about 1,000 mm. The rod was rolled into a slender rod having a diameter of 9.5 mm. This rod was then subjected to surface peeling and was then elongated, whereby a wire having a diameter of 1.2 mm was produced. Thus, it was confirmed that four nickel-base alloy welding materials A, B, C and D can be manufactured.

(Step 2)

Figure 2A:
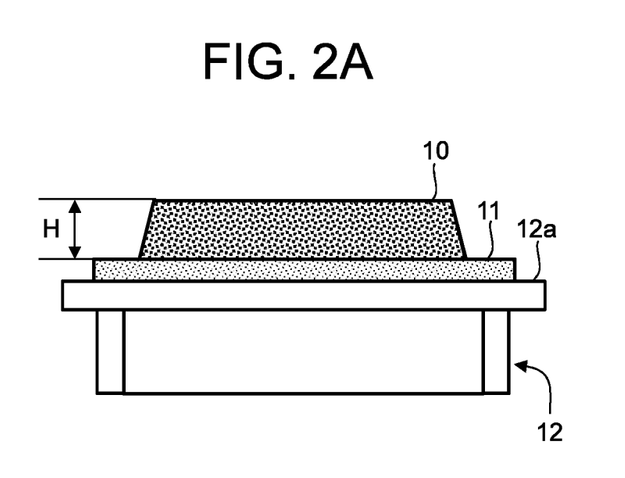
FIGS. 2A, 2B and 2C are a front view, a side view and a plan view, respectively, and illustrate how each test piece is prepared.
Figure 2B:
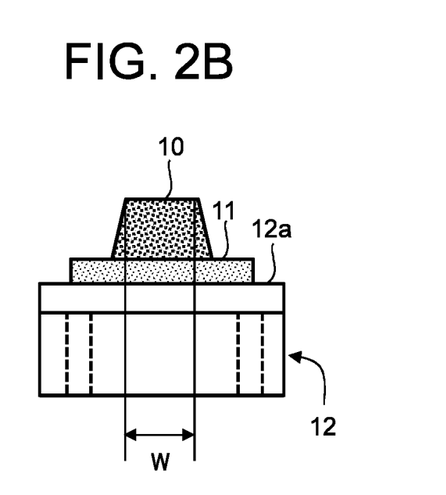
Figure 2C:
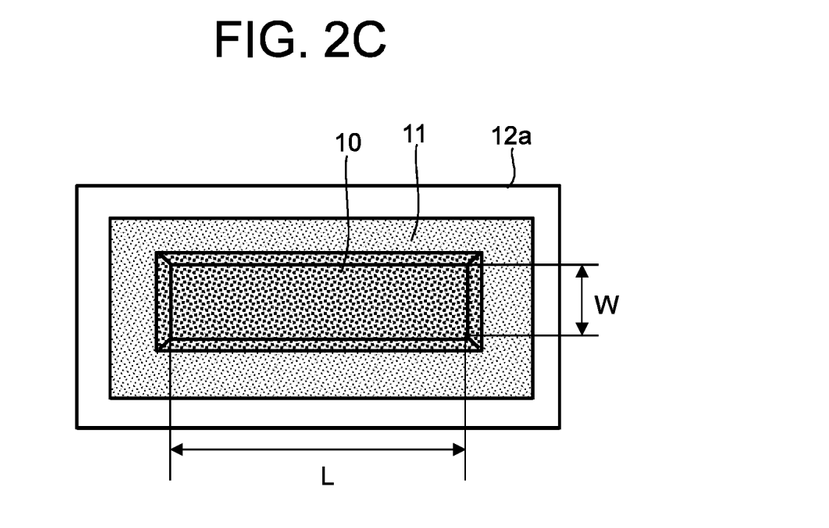

FIGS. 2A, 2B and 2C are a front view, a side view and a plan view, respectively, and illustrate how each test piece is prepared. As shown in FIGS. 2A, 2B and 2C, a base 11 shaped like a flat plate was formed on the flat plate 12a of a bridge 12, and a cladded layer 10 was formed on the base 11. The bridge 12 is rigid enough to prevent the base 11 from deforming. The base 11 is made of series-600 alloy. Three test pieces were prepared for each example of the nickel-base alloy welding materials.

The examples of the nickel-base alloy welding material prepared in Step 1, each of the examples A, B and C which are formed on each base 11 by means of gas-tungsten arc welding performed at input heat of 16 KJ/cm or less, base current of 180 A, and welding-material feeding speed of 900 mm/min. Each cladded layer 10, having length L of 250 mm, width W of 60 mm and height H of 50 mm, is thereby formed on each base 11 as illustrated in FIGS. 2A, 2B and 2C.

The examples A, B and C are examined, confirming that clad-layer welding can be achieve and do not have any defects.

The example D is similar to the example A, except for the use of Mo, and may therefore be used as welding material in the same conditions as the example A is used.

(Step 3)

From the cladded layer 10 of each example formed in Step 2, four CBB test pieces 20 are cut, each piece being 10 mm wide, 50 mm long and 2 mm thick. The four test pieces of each sample are put to a creviced bent beam (CBB) test, which will be described below.

Figure 3A:
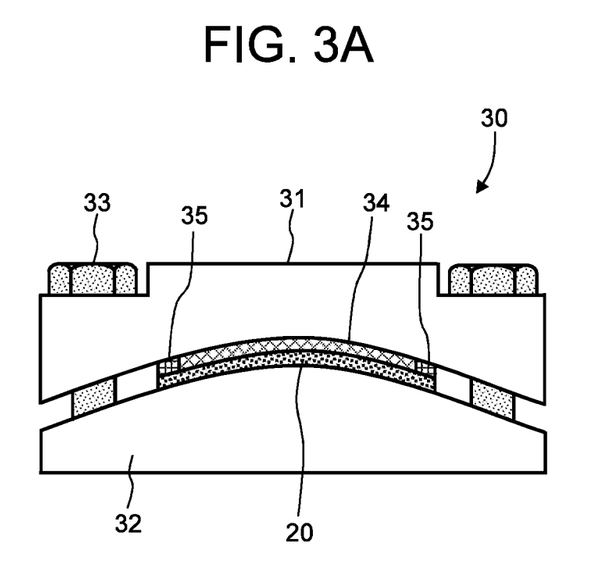
FIGS. 3A and 3B are a front view and a side view, respectively, and illustrate a CBB test jig 30.
Figure 3B:
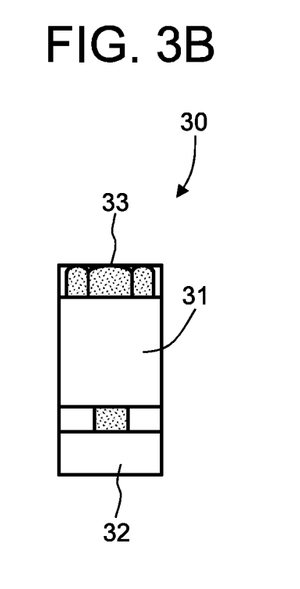

FIGS. 3A and 3B illustrate a CBB test jig 30. More precisely, FIG. 3A is a front view, and FIG. 3B is a side view. In the following description, the words "upper" and "lower" are used for the sake of convenience, and do not define the actual directions.

As seen from FIGS. 3A and 3B, the CBB test jig 30 is shaped in rectangular parallelepiped as a whole. The CBB test jig 30 has an upper half 31, a lower half 32, a graphite wool pad 34, two spacers 35, and two bolts 33. The upper half 31 and the lower half 32 hold a CBB test piece 20 between them. The graphite wool pad 34 and the two spacers 35 keep a gap between the CBB test piece 20 and the upper half 31. The bolts 33 fasten upper half 31 and lower half 32 together. The two spacers 35 are arranged, sandwiching the graphite wool pad 34.

The upper half 31 curves upwards in the longitudinal direction, in the form of a concave. The lower half 32 curves upwards in the longitudinal direction, in the form of a convex so that the concave surface of the upper half 31 and the convex surface of the lower half 32 face each other. The concave surface of the upper half 31 and the convex surface of the lower half 32 each have a radius of curvature of 100 mm.

The CBB test piece 20 is clamped between the upper half 31 and the lower half 32 and is fastened as the bolts 33 fasten. At this time, the graphite wool pad 34 and the spacers 35 provide a gap between the CBB test piece 20 and the upper half 31. The spacer 35 and the lower half 32 apply a bending load to the CBB test piece 20, and a space is provided at the upper surface of the CBB test piece 20, for forming a corrosion environment.

In the test system so structured as described above, the CBB test is performed on the CBB test pieces 20 made of the nickel-base alloy welding materials (i.e., examples A, B and C) in order to evaluate the sensitivity to stress corrosion cracking in high-temperature water.

In the CBB test, an autoclave was used and the CBB test pieces 20 are immersed in high-temperature, high-pressure pure water, at 288° C. and 7.8 MPa, and for 500 hours, and are then examined to see whether they had undergone stress corrosion cracking (SCC). Subjected to this test, four samples made of four different nickel-base alloy welding materials are used.

Figure 4:
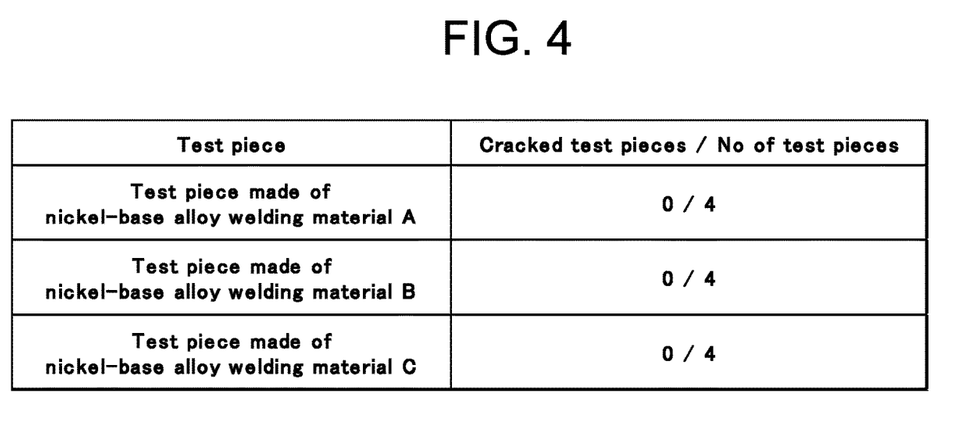
FIG. 4 is a table showing the result of the CBB test.

FIG. 4 is a table showing the result of the CBB test. More specifically, FIG. 4 shows number of the cracked test pieces subjected to the CBB test, for each of the examples A, B and C.

As a result, the four test pieces of each sample (i.e., sample A, B or C) did not undergo the stress corrosion cracking. The test pieces of the example D are considered to excel in anti-SCC property since their Cr content influencing the anti-corrosion property is similar to that of the example A.

A similar test is conducted on the test pieces made of series-182 alloy. It is reported that these test pieces exhibited SCC-sensitivity. (Refer to "Process Influence on the SCC-sensitivity of the nickel-base alloy welding material immersed in high-temperature water," *Materials and Environment,* 2005, A310)

(Step 4)

CT (compact tension) test pieces are cut from the cladded layer 10 of the example C formed in Step 2. The CT test pieces are subjected to the stress corrosion cracking (SCC) test.

Figure 5A:
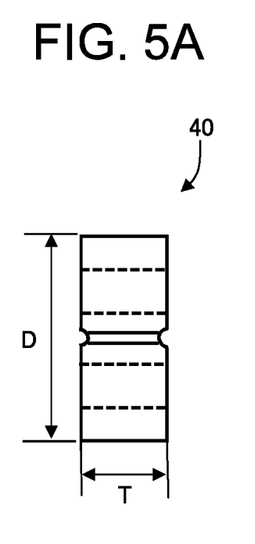
FIGS. 5A, 5B and 5C are a left-side view, a front view, and a right-side view, respectively, and illustrate shape of the CT test pieces subjected to the stress corrosion cracking (SCC) test.
Figure 5B:
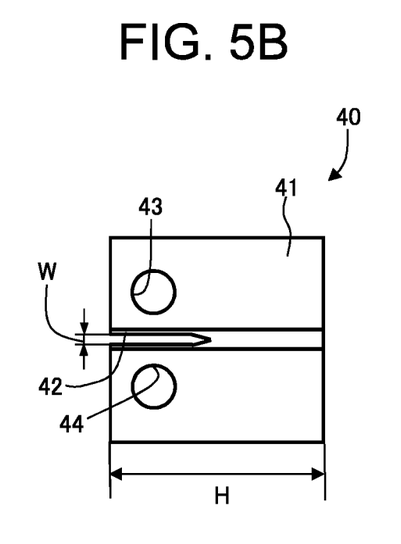
Figure 5C:
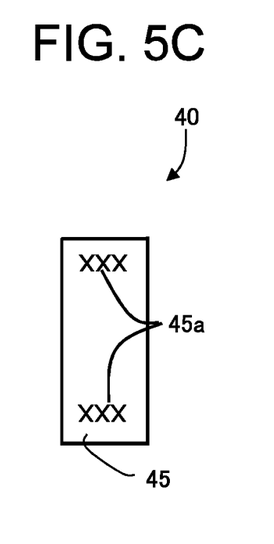

FIGS. 5A, 5B and 5C illustrate one of the CT test pieces subjected to the stress corrosion cracking (SCC) test. More precisely, FIG. 5A is a left-side view, FIG. 5B is a front view, and FIG. 5C is a right-side view.

Each CT test piece 40 has a groove 42 in that part of the base 41 which is middle in the widthwise direction of the base 41. Further, the CT test piece 40 has load-applied parts 43 and 44. An extension load is applied between the load-applied parts 43 and 44. On the back 45 of the base 41 (i.e., right side as seen in FIG. 5), marks 45a are punched at the two parts which will be separated from each other.

Each CT test piece 40 has thickness T of 12.7 mm, width D of 30.48 mm and height H of 31.75 mm, all in nominal values. The groove 42 has width W of 16 mm.

First, the fatigue crack is applied in each of the test pieces 40 in the atmosphere at room temperature. Then, they are brought into an autoclave, and underwent therein environmental preliminary cracking in the water condition specified below. Thereafter, they are subjected to a stress corrosion cracking (SCC) test performed in the water condition and load condition, both specified below.

Water Condition

Temperature: 288° C.
Pressure: 9 MPa
Corrosion potential (ECP): 150 $mV_{SHE}$ or more Load Condition Test load: 7.0 kN Target stress intensity factor K: about 32 to 34 MPa$\sqrt{m}$ The time for which cracking propagates at a constant load is set to 562.9 hours. After the test, the propagation speed of the cracking is calculated by surface correction.

Figure 6:
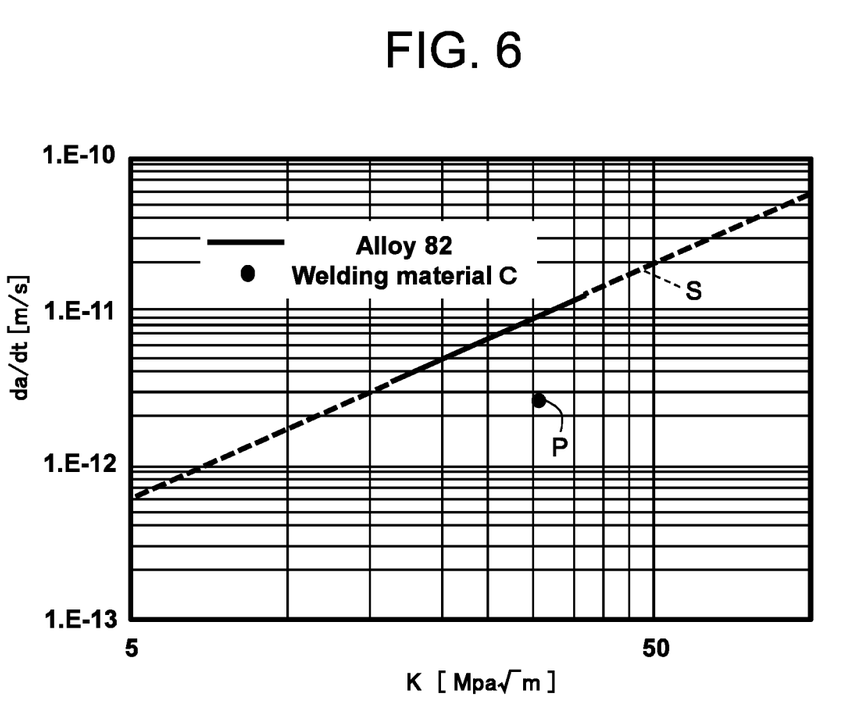
FIG. 6 is a graph showing the relation between the SCC cracking speed and the stress intensity factor with respect to the series-82 welding material and the nickel-base alloy welding material C according to the present embodiment.

FIG. 6 is a graph showing the relation between the SCC cracking propagation speed and the stress intensity factor with respect to the series-82 welding material and the nickel-base alloy welding material C according to the present embodiment. In FIG. 6, curve S represents the average SCC cracking propagation speed for the proposed series-82 alloy (TIG welding material) (Refer to "report on the stress corrosion cracking (SCC) of Ni-based alloys", 2005, the Nuclear Power Safety Standards Commission). Point P shown in FIG. 6 depicts the test result for the example C of the nickel-base alloy welding material.

The example C, i.e. nickel-base alloy welding material, has a cracking propagation speed of $2.63 \times 10^{-12}$ m/s at stress intensity factor K of 32.2 MPa$\sqrt{m}$. The crack developing speed da/dt at that time was less than about $1.23 \times 10^{-12}$ [m/s]. As seen from FIG. 6, the example C, i.e. nickel-base alloy welding material, had a crack propagation speed da/dt far lower than that of series-82 alloy.

As described above, the present embodiment can provide a nickel-base alloy welding material and a welding material for use in nuclear reactors, which have prominent anti-SCC property and excel in weldability.

Figure 7:
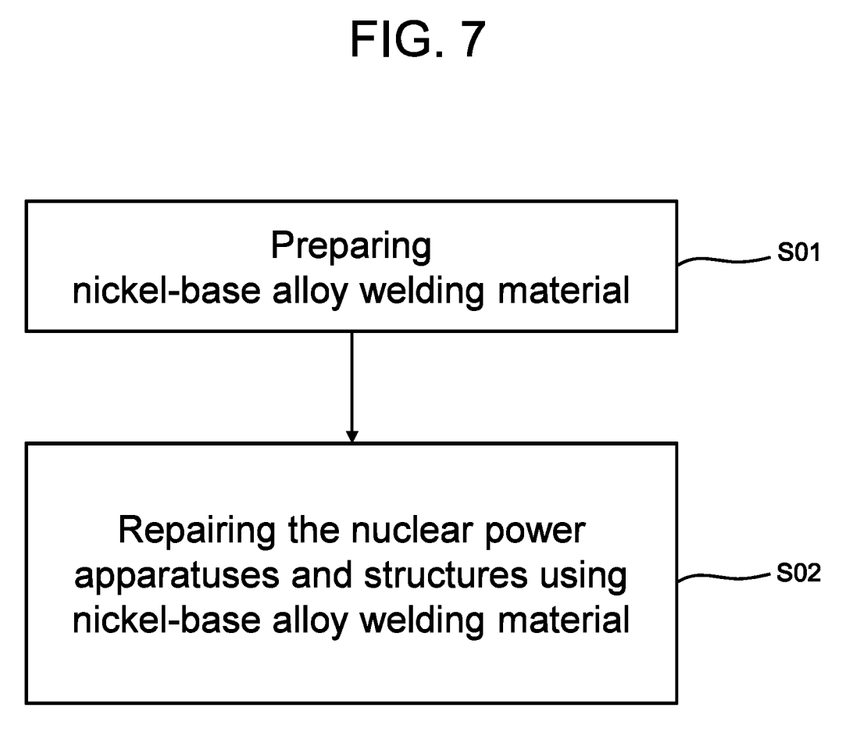
FIG. 7 is a flowchart showing the sequence of a method of repairing nuclear power apparatuses and structures.

FIG. 7 is a flowchart showing the sequence of a method of repairing apparatuses and structures of nuclear power plants. First, a nickel-base alloy welding material is prepared (Step S01). The nickel-base alloy welding material is a welding material according to the present embodiment.

Next, repairing the apparatuses and structures of nuclear power plants is performed with the nickel-base alloy welding material prepared in Step S01 (Step S02). As in the embodiment described above, the welding material having prominent anti-SCC property and excelling in weldability is used, repairing the apparatuses and structures of nuclear power plants at high reliability.

Figure 8:
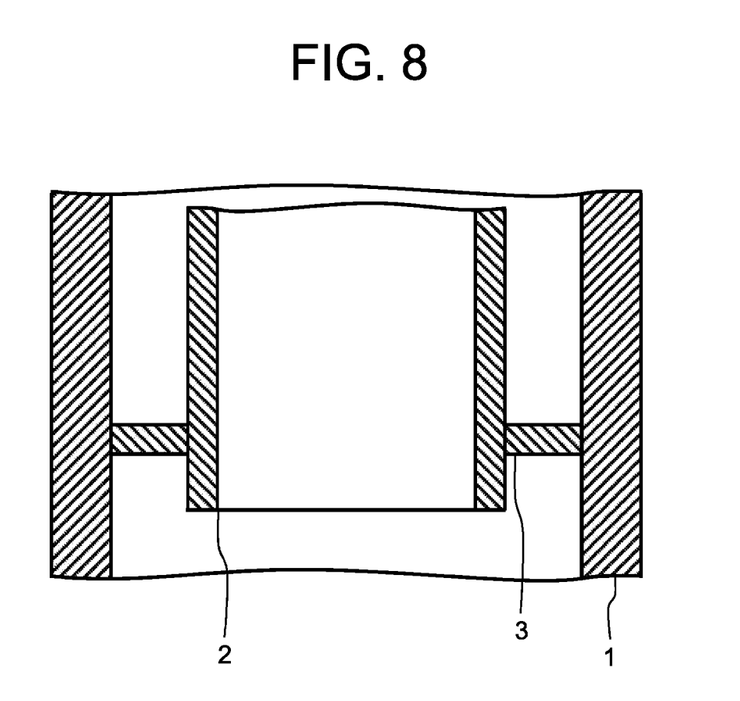
FIG. 8 is a partial, sectional longitudinal view schematically showing a shroud support for use in boiling-water nuclear reactors.

FIG. 8 is a partial, longitudinal cross-sectional view schematically showing a shroud support in boiling-water nuclear reactors. The shroud support 2, which surrounds the reactor core at radially outer sides of the core, is supported by a reactor pressure vessel 1 via a shroud support 3. The shroud support 3 is welded to the reactor pressure vessel 1 with dissimilar material joint.

Figure 9:
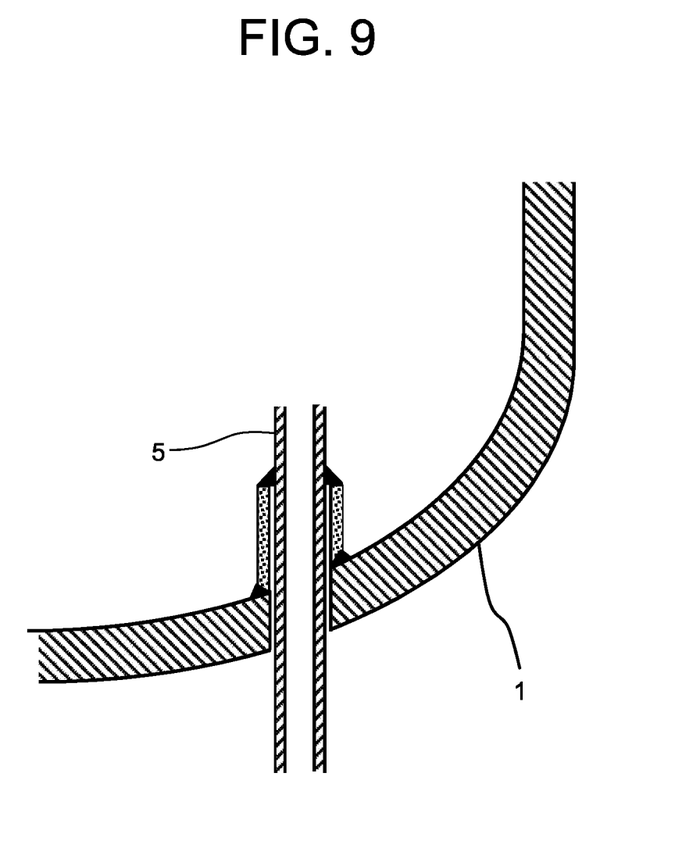
FIG. 9 is a partial sectional longitudinal view schematically showing a penetration of the control-rod drive mechanism housing of a boiling-water nuclear reactor.

FIG. 9 is a partial vertical cross-sectional view schematically showing a penetrated part of the control-rod drive mechanism housing of a boiling-water nuclear reactor from below. The welded part that seals the penetrated part of the control-rod drive mechanism housing 5 is also that with dissimilar material joint.

The nickel-base alloy welding material according to the present embodiment can be used for welding joint such as those of the apparatuses and structures of nuclear power plants. Further, the material can be used not only for dissimilar material joint of the shroud support and the penetrated part of the control-rod drive mechanism housing in the boiling-water nuclear reactors, but also for nozzles (not shown) formed in the upper cover of the pressure vessel and some parts of the steam generator in the pressurized water reactor.

Moreover, the nickel-base alloy welding material according to the present can be used in power plants, chemical plants, ocean-cruising ships and buildings, where nickel-base alloy will be used to satisfy the requirement of high corrosion-resistance property.

Other Embodiments

While embodiments of the present invention have been described, the embodiment has been presented by way of example only, and is not intended to limit the scope of the invention.

Furthermore, the above-described embodiment may be put to use in various different ways and, if appropriate, any of the components thereof may be omitted, replaced or altered in various different ways without departing from the spirit and scope of the invention. Therefore, the above-described embodiment and the modifications made to them are within the spirit and scope of the present invention, which is specifically defined by the appended claims, as well as their equivalents.

What is claimed is:

1. A nickel-base alloy welding material comprising: Cr (chromium) larger than 30.2% and less than or equal to 36.0% by mass; C (carbon) less than or equal to 0.050% by mass; Fe (iron) larger than or equal to 1.00% and less than or equal to 3.00% by mass; Si (silicon) less than or equal to 0.50% by mass; Nb (niobium)+Ta (tantalum) less than or equal to 3.00% by mass; Ti (titanium) larger than or equal to 0.001% and less than or equal to 0.70% by mass; Mn (manganese) larger than or equal to 0.10% and less than or equal to 3.50% by mass; Cu (copper) less than or equal to 0.5% by mass; Zr (zirconium) larger than or equal to 0.001% and less than or equal to 0.05% by mass, V (vanadium) larger than or equal to 0.001% and less than or equal to 0.5% by mass, B (boron) larger than or equal to 0.01% and less than or equal to 0.05% by mass, and a remainder is Ni and unavoidable impurities.

2. The nickel-base alloy welding material according to claim 1, further comprising Mo (molybdenum) larger than or equal to 2.00% and less than or equal to 5.00% by mass.

3. The nickel-base alloy welding material according to claim 1, further comprising Al (aluminum) less than or equal to 0.5% by mass.

4. The nickel-base alloy welding material according to claim 1, further comprising Co (cobalt) less than and equal to 0.12% by mass.

5. The nickel-base alloy welding material according to claim 1, wherein the unavoidable impurities are S (sulfur) and P (phosphorus), each at 0.005% by mass.

6. A welding material for use in nuclear reactors, wherein said welding material is the nickel-base alloy welding material according to claim 1.

7. A nuclear power apparatus and a nuclear power structure, each comprising the nickel-base alloy welding material according to claim 1.

8. A method of repairing a nuclear power apparatus and a nuclear power structure, the method comprising:
a step of preparing nickel-base alloy welding material according to claim 1, as welding material for mending the nuclear power apparatus and the nuclear power structure; and
a step of using the nickel-base alloy welding material, thereby mending the nuclear power apparatus and the nuclear power structure.

* * * * *